(12) United States Patent
Saliba et al.

(10) Patent No.: US 7,889,893 B2
(45) Date of Patent: Feb. 15, 2011

(54) METHOD AND DEVICE FOR VERIFYING THE AUTHENTICITY OF A CAPTURED BIOMETRIC CHARACTERISTIC

(75) Inventors: Eric Saliba, Chatou (FR); Nicolas Tissot, Cormeilles en Parisis (FR)

(73) Assignee: Morpho, Paris (FR)

( * ) Notice: Subject to any disclaimer, the term of this patent is extended or adjusted under 35 U.S.C. 154(b) by 860 days.

(21) Appl. No.: 11/815,725

(22) PCT Filed: Feb. 6, 2006

(86) PCT No.: PCT/FR2006/000268

§ 371 (c)(1),
(2), (4) Date: Aug. 7, 2007

(87) PCT Pub. No.: WO2006/084982

PCT Pub. Date: Aug. 17, 2006

(65) Prior Publication Data

US 2008/0152196 A1 Jun. 26, 2008

(30) Foreign Application Priority Data

Feb. 8, 2005 (FR) .................................. 05 01267

(51) Int. Cl.
*G06K 9/20* (2006.01)
(52) U.S. Cl. ..................................... 382/127
(58) Field of Classification Search .................. 382/127
See application file for complete search history.

(56) References Cited

U.S. PATENT DOCUMENTS

| | | | | |
|---|---|---|---|---|
| 3,968,476 A * | 7/1976 | McMahon | .................. | 382/127 |
| 6,292,576 B1 * | 9/2001 | Brownlee | .................... | 382/124 |
| 7,798,405 B2 * | 9/2010 | Ni | ............................... | 235/454 |
| 2002/0076089 A1 * | 6/2002 | Muramatsu et al. | ......... | 382/124 |
| 2005/0205667 A1 * | 9/2005 | Rowe | .......................... | 235/382 |
| 2005/0265585 A1 * | 12/2005 | Rowe | .......................... | 382/124 |

OTHER PUBLICATIONS

Seigo Igaki e al: "Holographic Fingerprint Sensor" Fujitsu-Scientific and Technical Journal, Fujitsu Limited. Kawasaki, Japan vol. 25, No. 4, Dec. 21, 1989, pp. 287-296, XP000103957 ISSN: 0016-2523, paragraph 2 "Conventional Sensors" and paragraph 3 "Holographic Fingerprint Sensor" figures 1-3.

(Continued)

*Primary Examiner*—Brian P Werner
(74) *Attorney, Agent, or Firm*—Patzik, Frank & Samotny, Ltd.

(57) ABSTRACT

The invention relates to a method of checking the authenticity of biometric sensing performed optically, in which a body organ (6) placed on a main face (2) of a prismatic optical element (1) is illuminated (8) with total internal reflection, and then the reflected radiation carrying the biometric image of said body organ is picked up (9). The method comprises the steps of superposing on the main illumination (8) on the main face (2) of the prismatic optical element (1), encoding illumination (14) in such a manner that it is the encoded combined radiation that is reflected by said main face (2) and picked up (9), and comparing (17) the encoded combined radiation with the encoding of the encoding illuminating radiation; thereby detecting the authenticity of the reflected radiation conveying the biometric image associated with the body organ placed on the main face.

16 Claims, 3 Drawing Sheets

OTHER PUBLICATIONS

Maltoni et al: "Handbook of Fingerprint Recognition" Jun. 2003, Springer, New York, XP002356776, pp. 59-64.
Maltoni et al: "Handbook of Fingerprint Recognition" Jun. 2003, Springer, New York, XP002356777, pp. 281-291.
Ratha and Bolle: "Automatic Fingerprint Recognition Systems" Dec. 2003, Springer, New York, XP002356778, pp. 415-431.
Bolle et al: "Guide to Biometrics" Mar. 2004, Springer, New York, XP002356779, pp. 211-215.

* cited by examiner

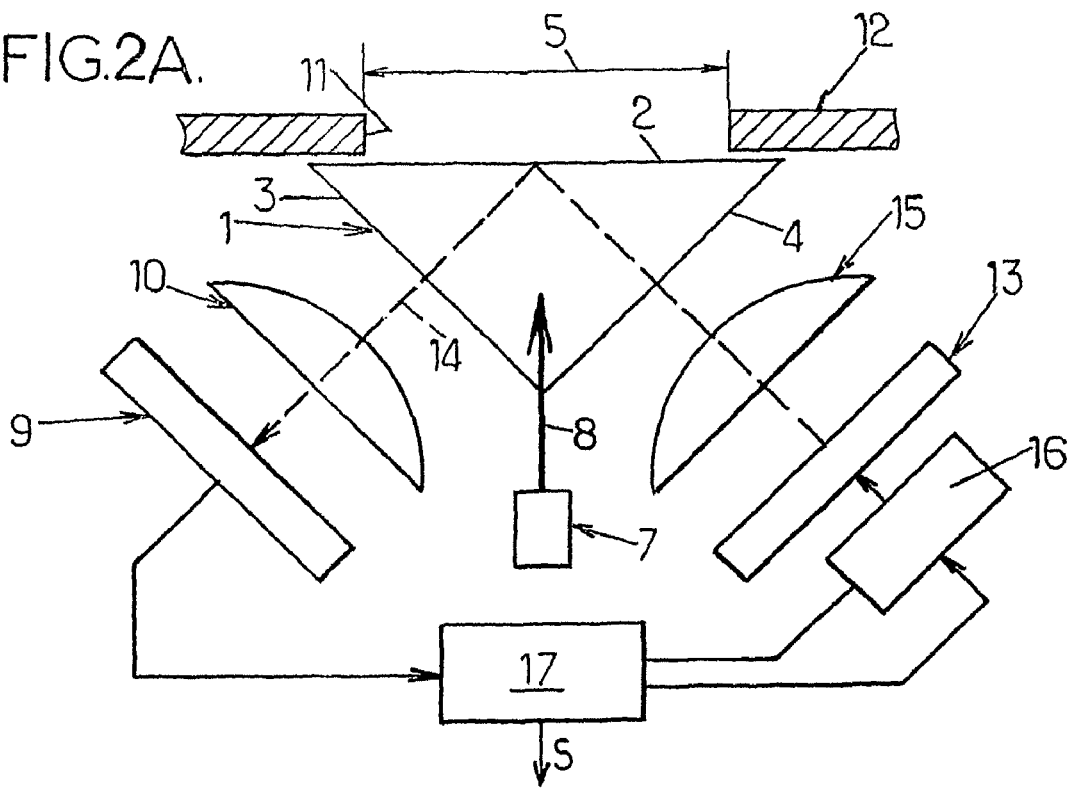
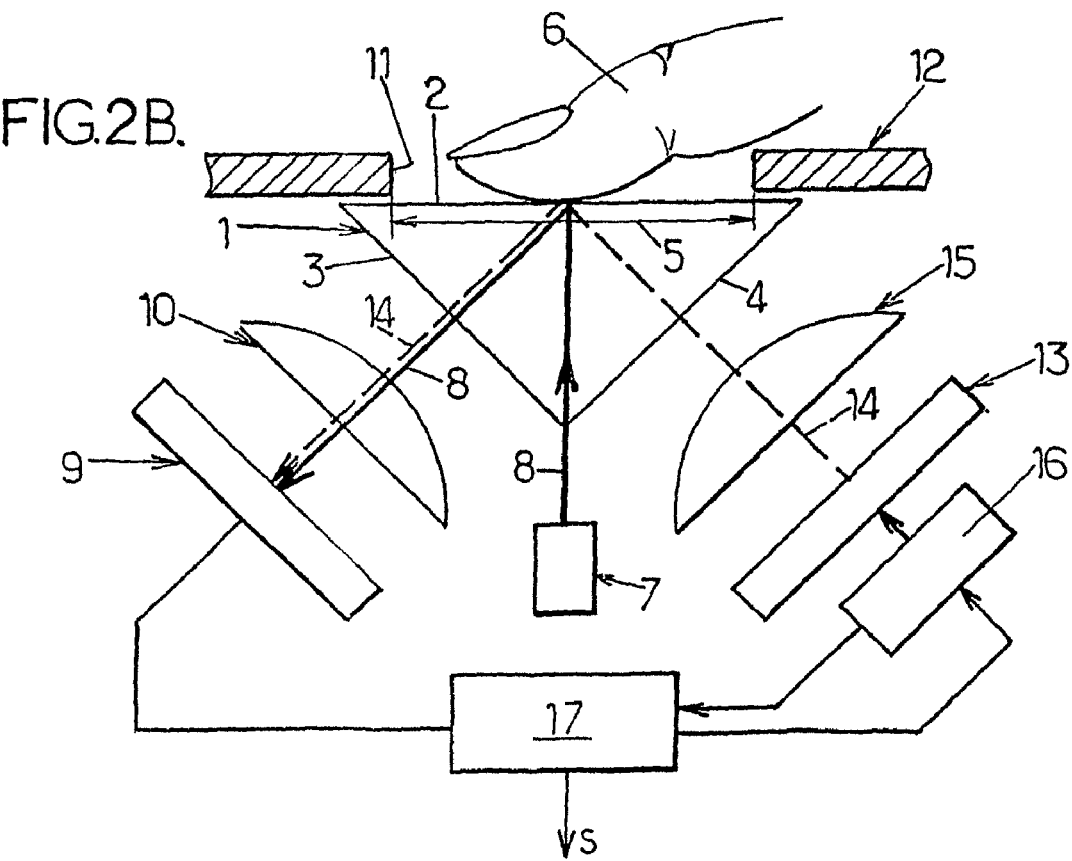

METHOD AND DEVICE FOR VERIFYING THE AUTHENTICITY OF A CAPTURED BIOMETRIC CHARACTERISTIC

FIELD OF THE INVENTION

The present invention relates in general to the field of sensing a biometric characteristic of an organ of the body, in particular, and commonly, to sensing the fingerprint of a digit of one hand.

In a first of its aspects, the invention relates more particularly to improvements applied to methods of checking the authenticity of biometric sensing performed optically, in which a body organ placed on a main face of a prismatic optical element is illuminated, and then the dispersion-reflected radiation carrying the biometric image of said body organ is picked up.

In a second of its aspects, for the purposes of checking the authenticity of an optical biometric sensing operation, the invention also relates to improvements applied to optical devices for biometric sensing, comprising:

a prismatic optical element having at least one main face and first and second side faces inclined on either side thereof, at least a portion of said main face constituting an application surface against which a body organ having a biometric characteristic for detection is pressed;

main illumination means disposed facing the prismatic optical element remote from said main face so that the main radiation emitted by said main illumination means penetrates into the prismatic optical element substantially perpendicularly to the main face so that, in the presence of a body organ placed thereon, it is reflected by dispersion by said main face towards the first inclined side face through which it passes substantially perpendicularly without significant deflection; and sensor means situated facing the first side face to receive the reflected radiation conveying a biometric image of the body organ.

BACKGROUND OF THE INVENTION

FIGS. 1A and 1B are diagrams showing a known arrangement for optical biometric sensing, typically for taking an image of the fingerprint of a digit of one hand. These figures show a known example of an optical device for biometric sensing comprising a prismatic optical element 1 (in this case an isosceles trihedral prism) having at least one main face 2 and first and second side faces, 3 and 4 respectively, that are inclined on either side of the main face, at least one portion 5 of said main face 2 constituting an application surface for pressing against a body organ (in particular a finger 6 in FIG. 1B) presenting a biometric characteristic that is to be detected (here the fingerprint of the finger 6). The device also includes main illumination means 7 disposed facing the prismatic optical element 1 remotely from said main face 2 (specifically facing the dihedral ridge formed by the side faces 3, 4) so that the main radiation 8 emitted by said main illumination means 7 penetrates into the prismatic optical element 1 substantially perpendicularly to the main face 2. Furthermore, the device includes sensor means 9 situated facing the first side face 3, with a focusing element (e.g. a converging lens 10) being interposed therebetween. Finally, it should be observed that the side face 4 opposite from the side face 3 facing the sensor means is black (the face 4 is coated in black varnish), as represented by a thick black line.

In the example shown in FIGS. 1A and 1B, said portion 5 constituting an application surface for a body organ is in the form of a window 11 opened in a housing 12 containing the device.

As shown in FIG. 1A, when no body organ is applied to the portion 5, the radiation 8 is reflected in the prismatic optical element 1 towards the black face 4, and by total internal reflection the sensor means 9 receives the image of the black face reflected on the main face 2.

As shown in FIG. 1B, when a body organ 6 is placed on the portion 5, some of the radiation is refracted by the so-called "moist" contact of portions in relief on the body organ 6 (the ridges of the fingerprint), which are the only portions genuinely pressed against the face 2: this makes it possible to perceive in the reflected image the image of the fingerprint (the ridges in contact with the surface of the portion 5 appear in white and the furrows that are not in contact with the surface of the portion 5 appear in black).

Such an optical biometric sensor device can give rise to various frauds, such as in particular injecting a fraudulent biometric image through the window 11, playing back a previously sensed image, physically removing the prismatic optical element 1 and replacing it with a fraudulent element, e.g. having a stolen fingerprint image placed thereon (e.g. drawn or in the form of traces), etc.

SUMMARY OF THE INVENTION

An essential object of the invention is to propose improved technical solutions (method and device) for enabling the image acquired on the optical biometric sensor device of the above-described type to be authenticated in real time and to ensure that it is not an image that has injected or played back in any manner whatsoever, and in this context, in auxiliary manner, to ensure that the image required does indeed come from the optical block of the optical biometric sensor device itself and not from a replacement optical block put into place after breaking into the device.

For these purposes, in a first of its aspects, the invention provides a method of checking the authenticity of biometric sensing performed optically, in which a body organ placed on a main face of a prismatic optical element is illuminated, and then the reflected radiation carrying the biometric image of said body organ is picked up, which method is characterized, according to the invention, by superposing on the main illumination on the main face of the prismatic optical element, encoding illumination formed by radiation of which at least one characteristic parameter is encoded in a time varying manner in such a manner that it is the encoded combined radiation that is reflected by said main face and picked up, and by comparing the encoded combined radiation with the encoding of the encoding illuminating radiation.

These dispositions make it possible to ensure the authenticity of the reflected radiation conveying the biometric image associated with the body organ placed on the main face.

In particular, the encoding of at least one characteristic parameter of the radiation emitted by the encoding illumination can be modified in random manner so as to make it more difficult to detect the encoding signal fraudulently. In particular, it is possible to encode the intensity and/or the frequency of the radiation emitted by the encoding illumination.

Still in the context of making detection and reproduction of the encoding signal more difficult, it is possible to ensure that the encoding is modified for each biometric sensing operation. In combination with the above, or independently, it is also possible to make provision for the encoding operation to be modified during a single biometric sensing operation. Thus, the device itself is checked in real time in a determined time window.

According to an additional feature seeking to improve the effectiveness of the method of the invention, it is possible also to provide at least one identifying mark on the main face of the prismatic optical element outside the portion thereof for having a body organ placed thereon, to illuminate said mark, and to check the presence of the image of said mark in the encoded combined radiation that is picked up. By means of these provisions, the authenticity of the prismatic optical element is checked during each optical sensing operation. Advantageously, in order to ensure that there is no interference between said mark and the light signal conveying the biometric image, the mark can be placed in a peripheral region of the main face of the prismatic optical element that is covered by a protective cap, in other words at the periphery or in the vicinity of the periphery of the prismatic optical element.

In a second of its aspects, the invention provides an optical device for biometric sensing implementing the above method, and comprising:

a prismatic optical element having at least one main face and first and second side faces inclined on either side thereof, at least a portion of said main face constituting an application surface against which a body organ having a biometric characteristic for detection is pressed;

main illumination means disposed facing the prismatic optical element remote from said main face so that the main radiation emitted by said main illumination means penetrates into the prismatic optical element substantially perpendicularly to the main face so that, in the presence of a body organ placed thereon, it is reflected by dispersion by said main face towards the first inclined side face through which it passes substantially perpendicularly without significant deflection; and sensor means situated facing the first side face to receive the reflected radiation conveying a biometric image of the body organ;

which device, when arranged in accordance with the invention, further comprises:

encoding illumination means disposed facing the second inclined side face and suitable for emitting encoding radiation substantially perpendicularly thereto, which encoding radiation, on reaching the main face, is superposed on the main radiation coming from the main illumination means to form encoded composite radiation reflected towards the first inclined side face and towards the sensor means;

encoding means functionally associated with the encoding illumination means and suitable for encoding in a time random manner at least one parameter of the encoding radiation; and comparator means suitable for comparing the encoded composite radiation received by the sensor means and the encoding emitted by the encoding illumination means and suitable for issuing an information signal.

Advantageously, provision is made for the encoding means to be suitable for encoding, in particular by varying in random manner at least one parameter of the encoding radiation.

In particular, provision can be made for the encoding means to be suitable for modifying the intensity and/or the frequency of the encoding radiation.

In an advantageous embodiment, the encoding means are placed under the dependency of detector means suitable for detecting the presence of a body organ placed on the main face of the prismatic optical element, and the encoding means are arranged to modify the parameter of the encoding radiation for each biometric sensing operation.

To further improve the effectiveness of the provisions implemented, it is also possible to provide for the encoding means to be arranged to modify the parameter of the encoding radiation during each biometric sensing operation.

In combination with one or the other of the above provisions, it is also possible to ensure that at least one identification mark is provided on the main face of the prismatic optical element outside the portion thereof that is suitable for having a body organ placed thereagainst; that the main illumination means are arranged also to illuminate said mark; and that the detection means are functionally associated with the sensor means to check for the presence of the image of said mark in the image received by the sensor means.

To ensure that this disposition is effective, it is advantageous for the mark to be situated in a peripheral region of the main face of the prismatic optical element, and a protective cap to be provided that covers the peripheral margin of said main face of the prismatic optical element by hiding said mark from an outside observer.

Various implementing configurations can be envisaged; in particular, provision can be made for the mark to be fitted on the main face of the optical element, or for the mark to be etched in the main face of the optical element.

BRIEF DESCRIPTION OF THE DRAWINGS

The invention can be better understood on reading the following detailed description of certain preferred embodiments given solely as purely illustrative examples. In this description, reference is made to the accompanying drawings, in which:

FIGS. 2A and 2B are diagrams of an optical device for biometric sensing in accordance with the invention, shown respectively in two functional situations.

Figure 3:
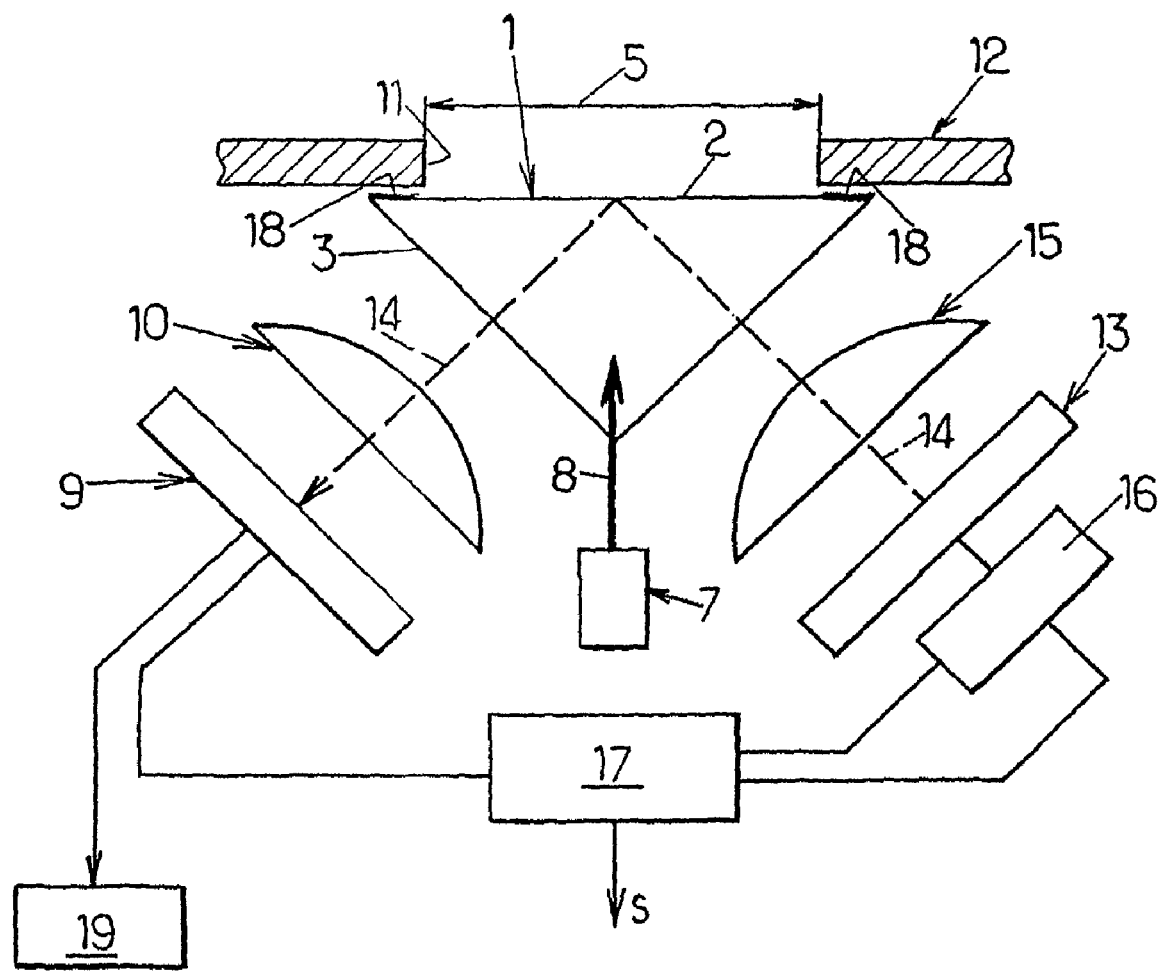
FIG. 3 is a diagram of an advantageous variant embodiment of the optical device for biometric sensing shown in FIGS. 2A and 2B.

In the description below with reference to FIGS. 2A, 2B, and 3, the same numerical references are used as for FIGS. 1A and 1B to designate members that are identical.

DETAILED DESCRIPTION OF THE INVENTION

Figure 1A:
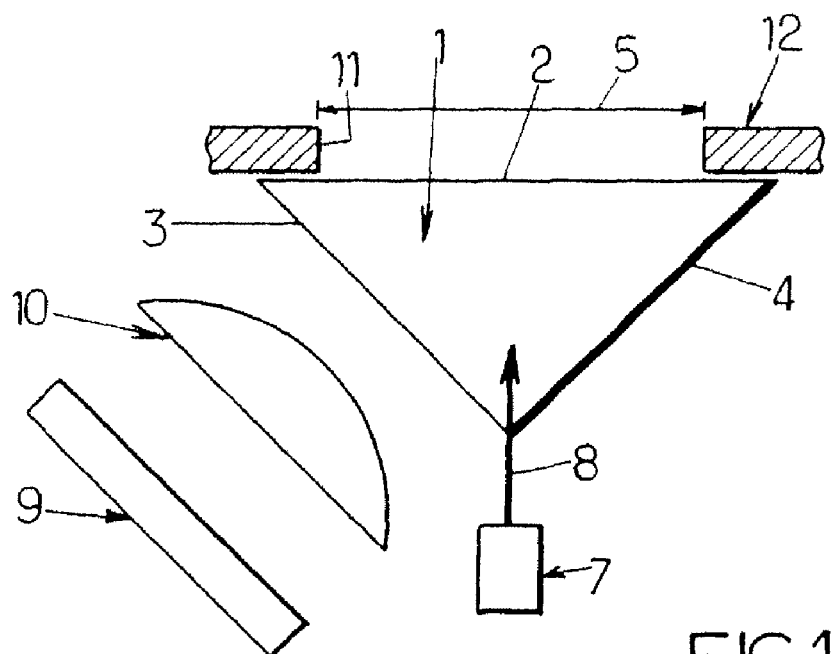
FIGS. 1A and 1B are diagrams of a state of the art optical device for biometric sensing, shown respectively in two functional situations.
Figure 1B:
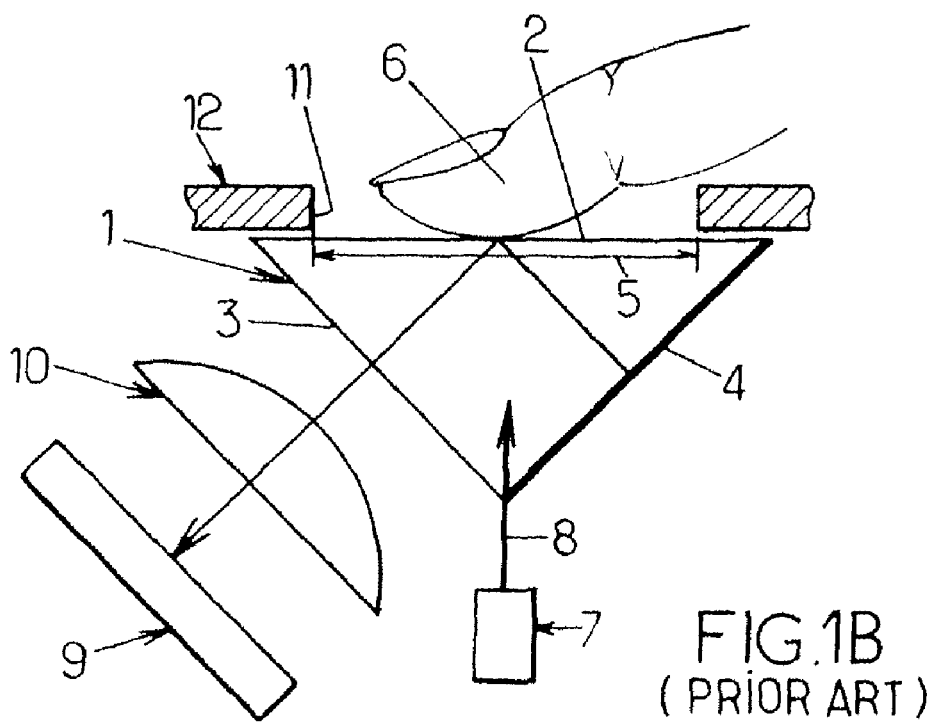

The optical device in accordance with the invention, as shown in FIG. 2A conserves the same basic structure as the state of the art device shown in FIGS. 1A and 1B, with the exception that the side face 4 of the prismatic optical element 1 is not blackened, but is transparent.

Facing the side face 4, there are situated encoding illumination means in the form of an encoding light source 13, e.g. made up of LCD diodes emitting encoding radiation 14 to the side face 4, substantially perpendicularly thereto. Between the encoding source 13 and the face 4, there is disposed a focusing element 15 (e.g. a converging lens) whose focal plane coincides substantially with the side face 4 of the prismatic optical element 1.

In addition, encoding means 16 are functionally associated with the encoding illumination means and are suitable for encoding in a time varying manner at least one characteristic parameter of the encoding radiation 14. In particular, the encoding means may be suitable for varying the encoding of at least one parameter of the encoding radiation 14, and in particular the intensity and/or the frequency and/or the phase of the encoding radiation. To counter any attempt at detecting and copying the encoding signal, provision is made for said radiation parameter(s) 14 to be varied in random manner.

The encoding radiation 14 penetrates into the prismatic optical element 1 though the side face 4, and by total internal reflection on the main face 2 it leaves the prismatic optical element 1 via the first side face 3 and reaches the sensor means 9.

In the embodiment shown in FIG. 2A, the encoding source 13 is continuously in operation, and as a result the sensor means 9 continuously receive the encoding radiation, including when no body organ is placed on the portion 5 of the main face 2 of the prismatic optical element 1, as shown in FIG. 2A: this disposition makes it possible to ensure that the device is always operating properly and in particular that the prismatic optical element 1 is always in place and properly positioned (no attempt at breaking in). Simultaneously, the main radiation 8 passes through the main face 2.

When a body organ 6, such as a digit of one hand, is placed on the portion 5 of the main face 2, as shown in FIG. 2B, the main radiation 8 is reflected by those zones of the body organ 6 that come directly into contact with the face 2 (the ridges of the fingerprint), while the radiation is not reflected by those zones of the body organ that are spaced apart from the face 2 (furrows in the fingerprint).

Under such circumstances, the reflected radiation 8 is superposed on the encoding radiation 14, and the sensor means 9 detect radiation from both in combination.

In order to ensure that the encoding radiation 14 is valid, and thus that the device has not been subjected to an attempt at fraudulent operation, provision is also made for comparator means 17 to receive firstly the combined radiation 8, 14 received by the sensor means, and secondly the encoding radiation 14, or as shown in FIGS. 2A and 2B, the encoding signal generated by the encoding means 16 for application to the encoding source 13. Said comparator means 17 are suitable for comparing the information received from both sources and for emitting a signal S that is continuous or present only when necessary, representative of the state of the device.

By means of the above-described dispositions, it is possible to ensure that the optical device for biometric sensing is operating correctly and honestly. The absence of reception of the encoding radiation 14 by the sensor means 9, e.g. because the encoding source 13 and/or the encoding means 16 is/are not operating, or indeed because the prism has been moved as a result of an attempt to break into the device, can lead to a signal S being issued that may be a warning signal and/or a signal for locking the device. Similarly, real time monitoring of the encoding radiation 14 makes it possible to ensure that the main radiation 8 for biometric sensing is valid and not the result of an attempted fraud, e.g. by playing back an earlier biometric sensing image or by injecting an image from the outside.

Nevertheless, in particular for energy saving reasons for example (the device being on standby when not performing biometric sensing), provision can be made for the encoding radiation 14 not to be emitted continuously but to be emitted only when a body organ is pressed against the face 2. Optionally, provision can also be made for the encoding means 16 to be placed so as to be dependent on detector means suitable for detecting the presence of a body organ 6 placed on the main face of the prismatic optical element (where such detection can be obtained for example from the sensor means 9, either directly, or else via the comparator means 17, as shown in FIGS. 2A, 2B), with the encoding means 16 being arranged to modify the parameter of the encoding radiation 14 for each biometric sensing operation; or else, steps can be taken to ensure that the encoding means 16 are arranged to modify the parameter of the encoding radiation 14 during each biometric sensing operation; it being understood that such modifications are preferably undertaken in random manner. By means of these dispositions, the signals received by the sensor means are monitored in real time, and preferably in a determined time window.

In an advantageous variant embodiment, provision can be made for an arrangement serving to ensure that the prismatic optical element 1 is indeed the original element and not a replacement element that has been put into place fraudulently, e.g. having an image of a body organ placed on its main face. For this purpose, and as shown in FIG. 3, at least one identifying mark 18 is provided on the main face of the prismatic optical element 1 away from the portion 5 thereof against which a body organ 6 is to be placed. Furthermore, the main illumination means 7 are arranged also to illuminate the mark 18. Finally, detector means 19 are functionally associated with the sensor means 9 to monitor the presence of the image of said mark 18 in the image received by the sensor means; the detector means 19 may be specific means, as shown in FIG. 3, or else the detection function may be integrated in a component that is already present, such as the comparator means 17.

It is advantageous for the mark 18 not to be visible from the outside so that it cannot be copied: for this purpose, the mark 18 may be situated in a peripheral region of the main face 2 of the prismatic optical element 1, and provision can be made for a protective cap secured to the housing 12 or forming a portion thereof to cover the peripheral margin of said main face 2 of the prismatic optical element 1 so as to hide said mark 18 from an outside observer.

The mark 18 may be made in any possible manner: in particular, the mark 18 may be a separate fitting, e.g. glued onto the main face 2 of the prismatic optical element 1, and/or it may be etched in said main face 2.

Still for the purpose of countering attempted fraud, it is preferable to provide a multiplicity of marks 18 distributed on the margins of the main face 2, with said distribution advantageously be random and not regular.

What is claimed is:

1. A method of checking the authenticity of biometric sensing performed optically, in which a body organ placed on a main face of a prismatic optical element is illuminated, and then the dispersion-reflected radiation carrying the biometric image of said body organ is picked up, the method comprising the steps of: superposing on the main illumination on the main face of the prismatic optical element, encoding illumination formed by radiation of which at least one characteristic parameter is encoded in a time varying manner in such a manner that it is the encoded combined radiation that is reflected by said main face and picked up, and by comparing the encoded combined radiation with the encoding of the encoding illuminating radiation, whereby the authenticity of the reflected radiation conveying the biometric image associated with the body organ placed on the main face is detected.

2. A method according to claim 1, wherein the encoding of at least one characteristic parameter of the radiation emitted by the encoding illumination is modified in random manner.

3. A method according to claim 1, wherein the intensity and/or the frequency of the radiation emitted by the encoding illumination is encoded.

4. A method according to claim 1, wherein the encoding is modified for each illumination sensing operation.

5. A method according to claim 1, wherein the encoding is modified during a single biometric sensing operation.

6. A method according to claim 1, further comprising providing at least one identifying mark on the main face of the prismatic optical element outside the portion thereof for having a body organ placed thereon, by also illuminating said mark, and by checking the presence of the image of said mark in the encoded combined radiation that is picked up, whereby the authenticity of the prismatic optical element is verified during each optical sensing operation.

7. A method according to claim 6, wherein the mark is placed in a peripheral region of the main face of the prismatic optical element that is covered by a protective cap.

8. An optical device for biometric sensing implementing the method according to claim 1, comprising:

a prismatic optical element having at least one main face and first and second side faces inclined on either side thereof, at least a portion of said main face constituting an application surface against which a body organ having a biometric characteristic for detection is pressed;

main illumination means disposed facing the prismatic optical element remote from said main face so that the main radiation emitted by said main illumination means penetrates into the prismatic optical element substantially perpendicularly to the main face so that, in the presence of a body organ placed thereon, it is reflected by dispersion by said main face towards the first inclined side face through which it passes substantially perpendicularly without significant deflection; and sensor means situated facing the first side face to receive the reflected radiation conveying a biometric image of the body organ;

the device being characterized in that it further comprises:

encoding illumination means disposed facing the second inclined side face and suitable for emitting encoding radiation substantially perpendicularly thereto, which encoding radiation, on reaching the main face, is superposed on the main radiation coming from the main illumination means to form encoded composite radiation reflected towards the first inclined side face and towards the sensor means;

encoding means functionally associated with the encoding illumination means and suitable for encoding in a time varying manner at least one parameter of the encoding radiation; and comparator means suitable for comparing the encoded composite radiation received by the sensor means and the encoding emitted by the encoding illumination means and suitable for issuing an information signal (S).

9. A device according to claim 8, wherein the encoding means are suitable for causing the encoding of at least one parameter of the encoding radiation to vary in random manner.

10. A device according to claim 8, wherein the encoding means are suitable for modifying the intensity and/or the frequency of the encoding radiation.

11. A device according to claim 8, wherein the encoding means are placed under the dependency of detector means suitable for detecting the presence of a body organ placed on the main face of the prismatic optical element, and in that the encoding means are arranged to modify the parameter of the encoding radiation for each biometric sensing operation.

12. A device according to claim 8, wherein the encoding means are arranged to modify the parameter of the encoding radiation during each biometric sensing operation.

13. A device according to claim 8, wherein:

at least one identification mark is provided on the main face of the prismatic optical element outside the portion thereof that is suitable for having a body organ placed thereagainst;

the main illumination means are arranged also to illuminate said mark; and the detection means are functionally associated with the sensor means to check for the presence of the image of said mark in the image received by the sensor means.

14. A device according to claim 13, wherein the mark is situated in a peripheral region of the main face of the prismatic optical element, and in that a protective cap is provided that covers the peripheral margin of said main face of the prismatic optical element by hiding said mark from an outside observer.

15. A device according to claim 8, wherein the mark is applied to the main face of the optical element.

16. A device according to claim 8, wherein the mark is etched in the main face of the optical element.

\* \* \* \* \*